United States Patent [19]
Ryu

[11] Patent Number: 4,618,164
[45] Date of Patent: Oct. 21, 1986

[54] SEATBELT ASSEMBLY

[75] Inventor: Nobuyuki Ryu, Toyota, Japan

[73] Assignee: Toyota Jidosha Kabushiki Kaisha, Japan

[21] Appl. No.: 717,870

[22] Filed: Mar. 29, 1985

[30] Foreign Application Priority Data

Sep. 28, 1984 [JP] Japan .................. 59-146742[U]

[51] Int. Cl.$^4$ ............................. B60R 21/10
[52] U.S. Cl. .................................... 280/804
[58] Field of Search ............... 280/802, 804, 803, 806, 280/808; 297/469, 473, 479, 483

[56] References Cited

U.S. PATENT DOCUMENTS

| | | | |
|---|---|---|---|
| 4,061,363 | 12/1977 | Nagano et al. | 280/804 |
| 4,236,729 | 12/1980 | Suzuki et al. | 280/804 |
| 4,324,419 | 4/1982 | Ueda | 280/804 |
| 4,343,489 | 8/1982 | Suzuki et al. | 280/804 |
| 4,498,690 | 2/1985 | Takada | 280/804 |
| 4,560,187 | 12/1985 | Yashitsuzo | 280/804 |

*Primary Examiner*—Richard A. Bertsch
*Attorney, Agent, or Firm*—Parkhurst & Oliff

[57] ABSTRACT

The present invention relates to an automatically fastening seatbelt assembly which causes an occupant of a vehicle to be automatically held to a seat in the vehicle by a restraining webbing, after the occupant is positioned on the seat in the vehicle. The seatbelt assembly includes a guide rail, a slider which is displaceable along the guide rail and a restraining webbing which is fixed to the slider at one end thereof. This guide rail is provided with stop switches at each end thereof. The stop switches are connected to a source of electricity or an electric control circuit through connecting wires. Further, the stop switches detect the arrival of the slider at either end of the guide rail and output signals to the electric control circuit. More particularly, the present invention relates to improvements in the stop switch assembly which protect the connecting wire which is connected to the stop switches. Specifically, the connecting wire is positioned in a stop switch assembly which includes a "C"-shaped guide bracket, around which the connecting wires are wrapped to prevent kinking in the connecting wires.

24 Claims, 7 Drawing Figures

SEATBELT ASSEMBLY

BACKGROUND OF THE INVENTION

The present invention relates to an automatically fastening seatbelt assembly which causes an occupant of a vehicle to be automatically held to a seat in the vehicle by a restraining webbing, after the occupant is positioned on the seat in the vehicle. The seatbelt assembly includes a guide rail, a slider which is displaceable along the guide rail and a restraining webbing which is fixed to the slider at one end thereof. This guide rail is provided with stop switches at each end thereof. The stop switches are connected to a source of electricity or an electric control circuit through connecting wires. Further, the stop switches detect the arrival of the slider at either end of the guide rail and output signals to the electric control circuit. However, known seatbelt assemblies have suffered from such problems as the connecting wires kinking near the stop switches during assembly of the seatbelt assembly to the vehicle body, resulting in increased production time and increasing production costs.

A similar seatbelt assembly is disclosed in U.S. Pat. No. 4,343,489. This patent discloses a seatbelt assembly which includes a guide rail having a longitudinal guide groove therein. The guide rail is fixed on a roof side member of a vehicle and a slider, which slides in the guide groove, is displaceable along the guide rail. Further, the slider is connected to one end of a restraining webbing by an anchor plate. The guide rail is provided with a first stop switch provided at a forward portion of the guide rail and a second stop switch provided at a rearward portion of the guide rail. The forward and rearward stop switches are connected to a source of electricity or an electric control circuit by connecting wires. The connecting wires supply current to the foreward and rearward stop switches, which in turn can supply an output signal to the electric control circuit. When an occupant sits on the front seat in the vehicle and the door of the vehicle is closed, the slider moves from a forward location to a rearward location as it is displaced along the guide groove. This movement of the slider results in the restraining webbing moving, causing the occupant to be automatically restrained in the seat by the restraining webbing.

When the slider approaches the rearward stop switch on the guide rail, the slider contacts an actuator on the rearward stop switch, thereby stopping any further rearward displacement of the slider. Conversely, when the occupant opens the door of the vehicle, the slider moves from its rearward location, along the groove, to a forward location causing the restraining webbing to move away from the occupant toward the front of the vehicle. When the slider approaches the forward stop switch, the slider contacts an actuator on the forward stop switch, thereby stopping any further forward displacement of the slider. Thus, the occupant may exit the vehicle. This seatbelt system makes it very convenient for an occupant to be fastened in by a seatbelt.

However, the seatbelt assembly is very difficult to install in a vehicle. Specifically, it is particularly troublesome to install the guide rail and the connecting wires of the forward and rearward stop switches. on the roof side member. The difficulty arises because the connecting wires often twist around the guide rail and frequently become tangled together when they are installed on the roof side member. U.S. application Ser. No. 712,607, filed Mar. 18, 1985, which is herein incorporated by reference, is contemporaneous with this application and discloses a fastening means for fastening the connecting wires to the guide rail prior to installing the guide rail on the vehicle. Such fastening means enable a worker to install the seatbelt assembly in a shorter amount of time because of the decreased amount of difficulty in handling the assembly. However, all installation problems have not been obviated by this contemporaneous application. Specifically, kinking or folding of the connection wires can still occur adjacent to the forward or rearward stop switches.

SUMMARY OF THE INVENTION

The present invention has been developed in view of the foregoing background and to overcome the foregoing drawbacks. It is accordingly an object of this invention to provide a stop switch assembly which prevents the kinking or folding of connecting wires which carry electric current to/from stop switches positioned at forward and rearward ends of a guide rail. To prevent the kinking of connecting wires, the seatbelt assembly according to the present invention includes a guide rail with a longitudinal guide groove therein. A slider is longitudinally displaceable along the guide groove. The slider is attached to a restaining webbing which functions as an automatic seatbelt. Forward and rearward stop switches are located at forward and rearward ends of the guide rail, respectively. The stop switches are actuated by contacting the slider. Further, the stop switches are connected to a source of electricity or an electric control unit by connecting wires. The connecting wires are attached to the guide rail by fastening means. Additionally, the stop switch assembly includes a C-shaped guide bracket which is located adjacent to the stop switch. A connecting wire is wrapped around the C-shaped bracket, thereby preventing the connecting wire from kinking or folding. Thus, this assembly provides for increased productivity by decreasing assembly time and obviating undesirable kinking in the connecting wires.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements.

DETAILED DESCRIPTION OF THE PREFERRED EMBODIMENTS

The present invention will be described in detail with reference to the accompanying drawings which illustrate different embodiments according to the present invention.

Figure 1:
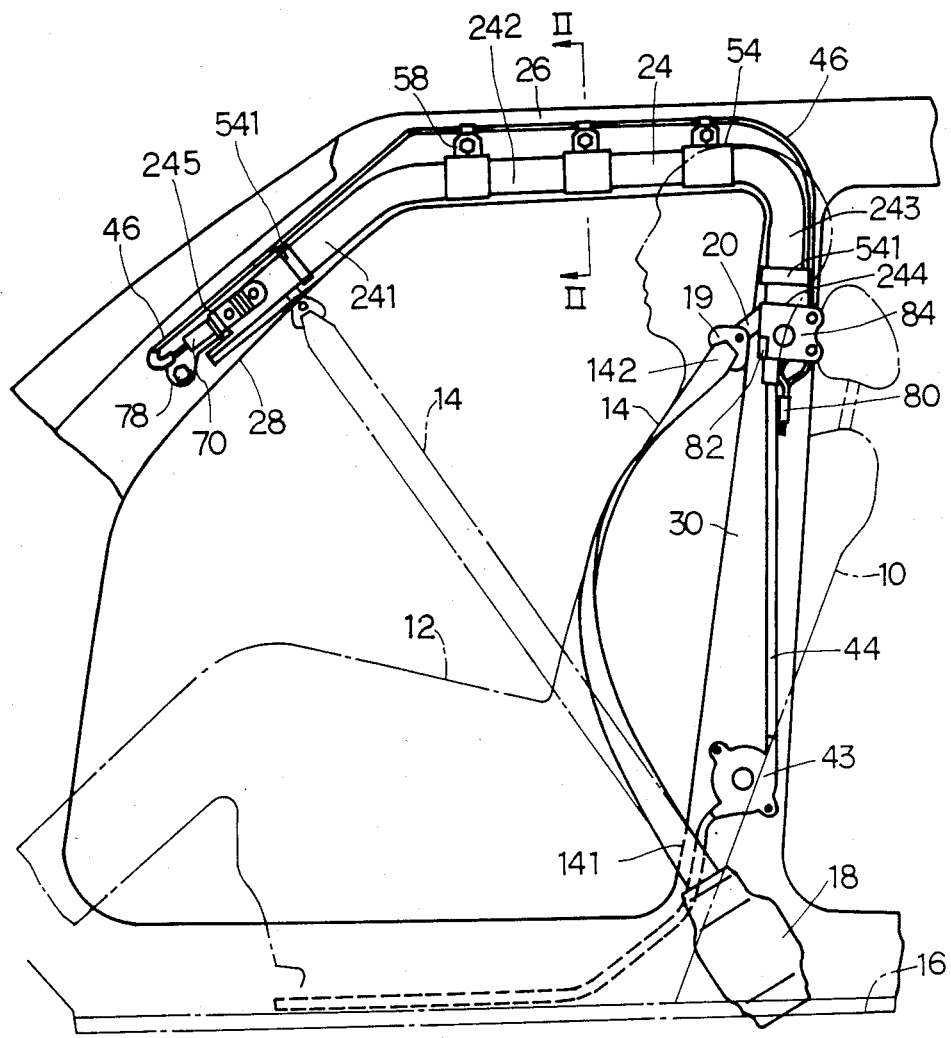
FIG. 1 is a side view of a seatbelt system according to the present invention installed on a passenger side of a vehicle, as viewed from the driver side of the vehicle.

Referring to FIG. 1, a restraining webbing 14 is designed such that it extends and surrounds the body of an occupant 12, when the occupant is positioned upon the seat 10. Further, when the vehicle door (not shown in drawings) is opened, the location of the restraining webbing 14 is represented by the broken line. A retractor 18 winds a portion 141 of the webbing 14 therein. The retractor 18 is secured to a floor member 16 of a vehicle. The retractor 18 is located at a substantially central portion in the lateral direction of the vehicle. The retractor 18 utilizes a locking mechanism which prevents an abrupt windoff of the webbing 14 in an emergency situation.

Figure 2:
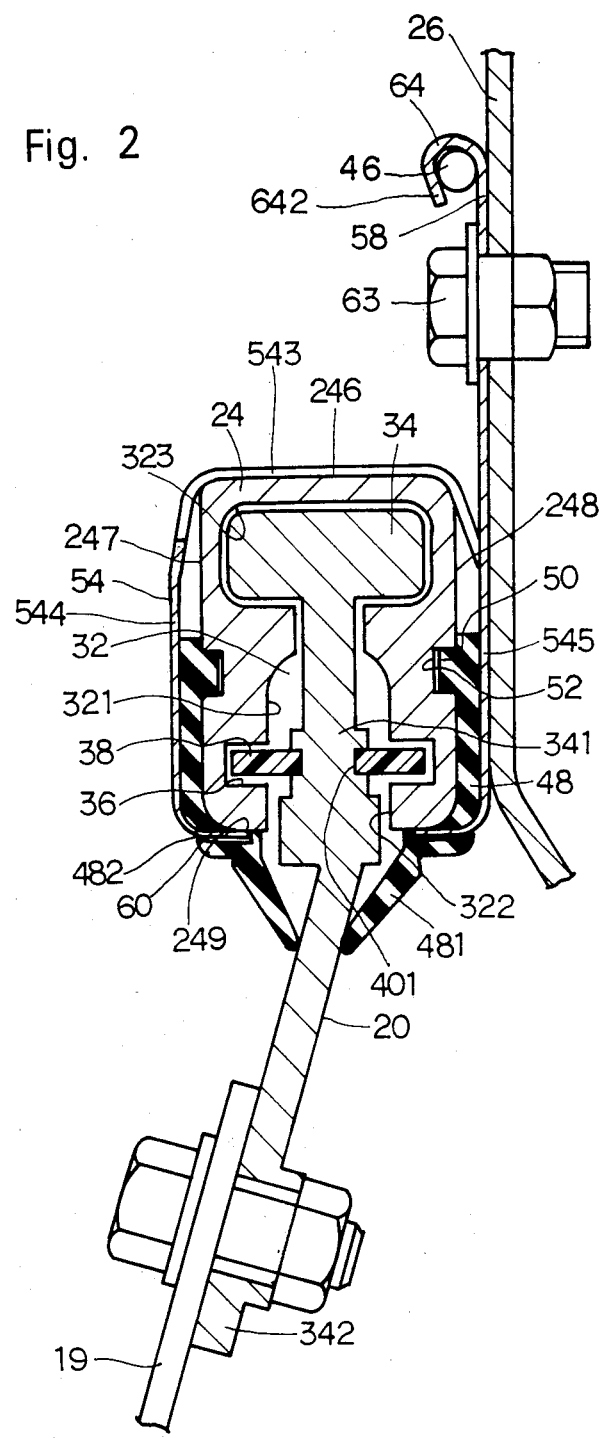
FIG. 2 is an enlarged cross-sectional view of taken along the line II—II in FIG. 1, wherein a slider is disposed on the line II—II in FIG. 1.

An outer portion 142 of the webbing 14 is connected to a slider 20 by an anchor plate 19. As shown in FIG. 2, the slider 20 is located within a guide groove 32 defined within a guide rail 24. The guide rail 24 is fixed on a front pillar 28, a roof side member 26 and a center pillar 30 of the vehicle. A slanted front portion 241 of the guide rail 24 is secured to the front pillar 28. A horizontal central portion 242 of the guide rail 24 is secured to the roof side member 26. A vertical rear portion 243 of the guide rail 24 is secured to the center pillar 30. Further, the guide groove 32 extends in a longitudinal direction along the guide rail 24, and the slide 20 is longitudinally displaceable along the guide groove 32.

As shown in FIG. 2, the slider 20 includes a head portion 34 and a body portion 341, such that the slider 20 is substantially T-shaped in cross-section. The body portion 341 includes a leg portion 342 at a lower end thereof. The head portion 34 is slidably received in a head groove 323. The body portion 341 includes an installing hole 401, which receives a driving tape 38. The driving tape 38 and the body portion 341 are displaceable throughout a guiding slit 322 which extends along the longitudinal direction of the guide rail 24. The driving tape 38 is displaceable within a tape groove 36, and the driving tape 38 perpendicularly intersects an intermediate portion 321 of the guide groove 32. The tape groove 36 also extends along the longitudinal direction of the guide rail 24. More specifically, the driving tape 38 is displaceable along the tape groove 36 such that the slider 20 can move between a forward portion 245 and a rearward portion 244 of the guide rail 24.

The anchor plate 19 is rotatably connected to a lower end of the leg portion of the slider 20 by a bolt and a nut assembly.

The guide rail 24 includes mounting grooves 52 which are longitudinally provided along the guide rail 24. The mounting grooves 52 can be continuously or intermittently formed in both side surfaces of the guide rail 24. The cover 48 conceals the guiding slit 322 of the guide groove 32 to improve the aesthetic appearance of the assembly. Further, projections 50 of the cover 48 are received and held within the mounting grooves 52.

Figure 3:
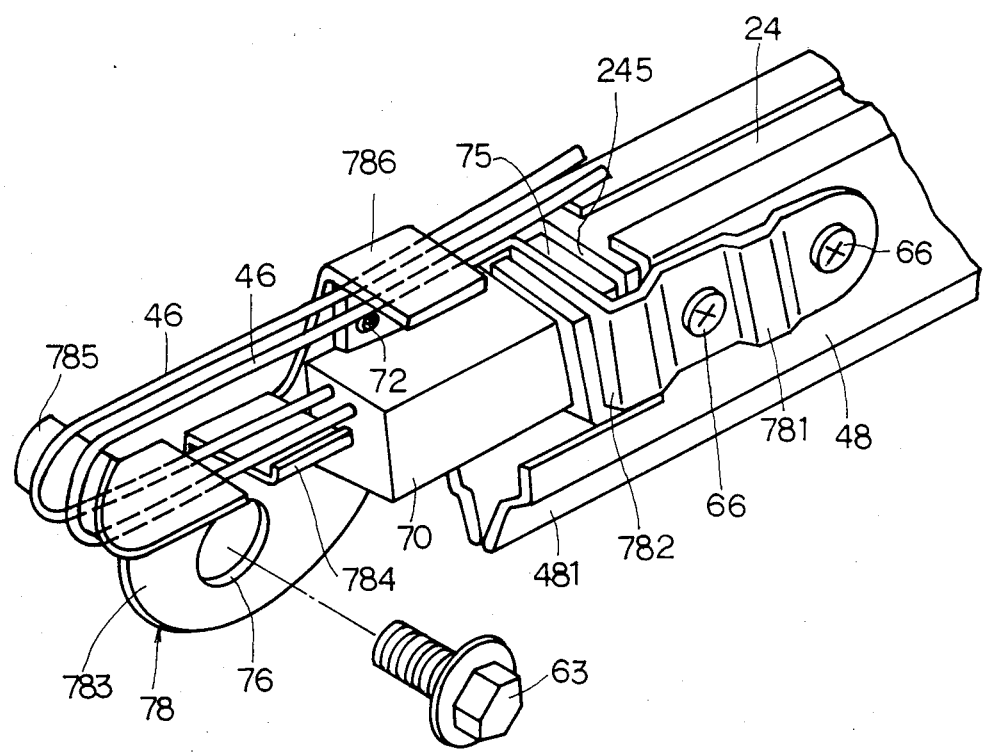
FIG. 3 is an enlarged perspective view of a first embodiment of the stop switch assembly according to the invention, showing in detail components which comprise a forward end portion of the guide rail shown generally in FIG. 1.
Figure 4:
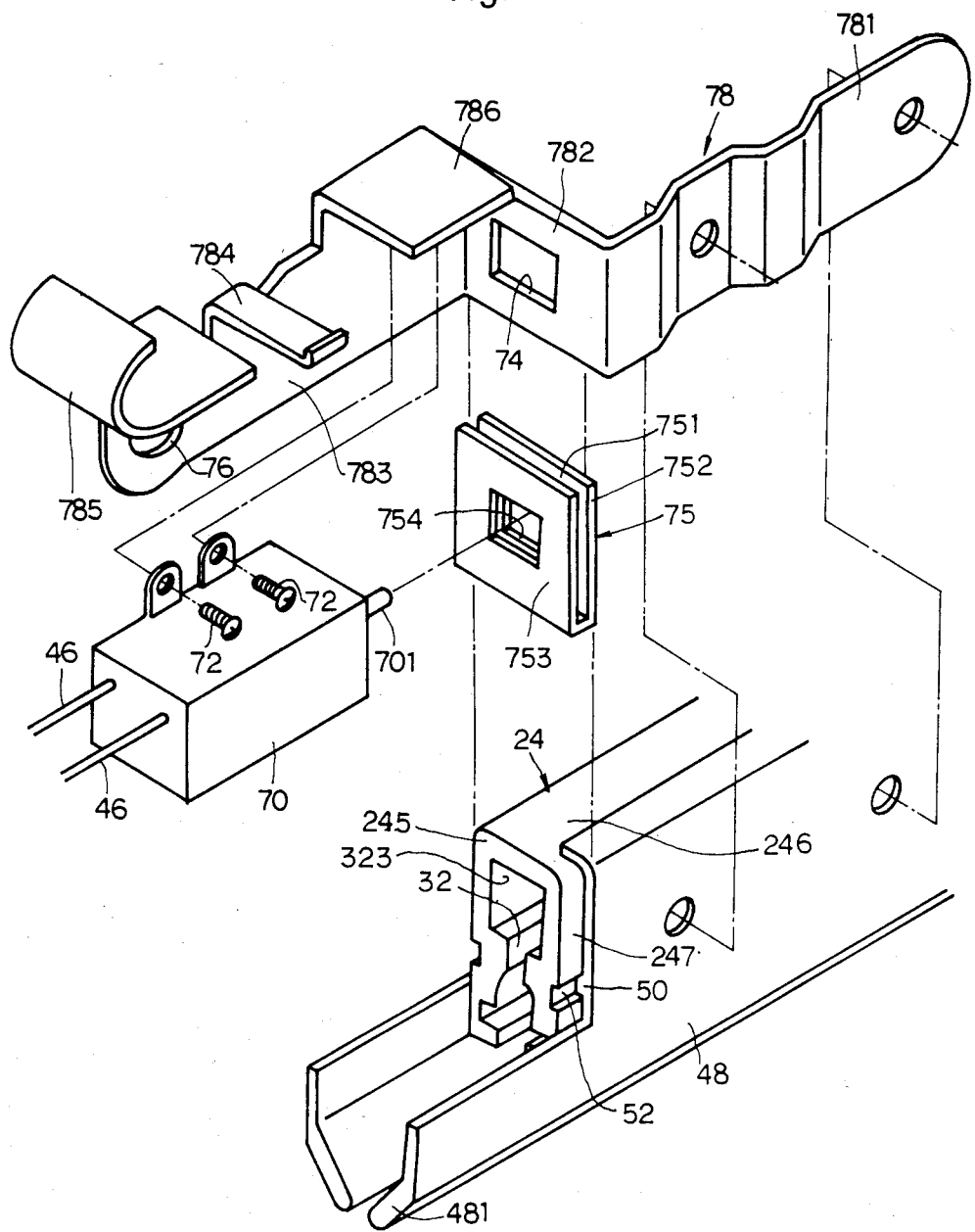
FIG. 4 is a perspective disassembled view of the embodiment shown in FIG. 3.

As shown in FIG. 1, a forward stop switch 70 is located on the front end 245 of the guide rail 24. The forward end 245 of the guide rail 24 is fixed to the vehicle body by a forward anchor bracket 78. A rearward stop switch 82 is located on the rearward end 244 of the guide rail 24. The rearward end 244 of the guide rail 24 is fixed to the vehicle body by a rearward anchor bracket 84. As shown in FIG. 3 and FIG. 4, actuators 701 of the forward stop switch 70 and the rearward stop switch 82 are located within the guide groove 32 such that they can be actuated by contacting the head portion 34 of the slider 20. When the head portion 34 of the slider 20 contacts the actuators 701, the slider 20 will not be displaced any further.

More specifically, the forward stop switch is fixed to a first anchor portion 783 of the forward anchor bracket 78 by bolts 72. The first anchor portion 783 has a hole 76 therethrough for inserting a bolt therein. The forward anchor bracket 78 further includes an intermediate portion 782 and a second anchor portion 781. The intermediate portion 782 extends substantially perpendicular from the rearward end of the first anchor portion 783, corresponding to a lateral direction in the vehicle. The intermediate portion 782 has an opening 74 therein, which accommodates the actuator 701 of the forward stop switch 70. The second anchor portion 781 extends substantially perpendicular from the intermediate portion 782 such that it substantially parallels the first anchor portion 783 along the longitudinal direction in the vehicle. The second anchor portion 781 is fixed to a side surface 247 of the guide rail 24 by bolts 66, with a cover 48 for the guide rail 24 being between the guide rail 24 and the second anchor portion 781. The intermediate portion 782 of the forward anchor bracket 78 is positioned within a damper 75. Specifically, the damper 75 is U-shaped in cross section, thereby creating a slit therein, whereby the intermediate portion 782 is inserted in the slit.

The forward anchor bracket 78 also includes a first flange 785, a second flange 784 and a third flange 786, and all three flanges are located on the first anchor portion 783. This first flange 785 is disposed on a forward end of the first anchor portion 783, the lateral plane of the first flange being substantially perpendicular to the longitudinal plane of the first anchor portion 783. The first flange 785 has a cross section which is substantially C-shaped. This C-shaped cross section permits electrical connecting wires 46 to be positioned around the first flange 785 and prevents folding or kinking of the wires 46. The second flange 784 is located between the first flange 785 and the intermediate portion 782 of the forward anchor bracket 78 along the first portion 783 of the forward anchor bracket 78.

The lateral plate of the second flange 784 is substantially perpendicular to the longitudinal plane of the first anchor portion 783, and extends in a lateral direction therefrom. The second flange 784 has an upward projection located at the end of the flange which is opposite to the intersection between the first anchor portion 783 and second flange 784. The third flange 786 is located between the second flange 784 and the intermediate portion 782 of the forward anchor bracket 78. The third flange 786 has a lateral plane which is substantially parallel to the lateral plane of the second flange 784. However, the lateral plane of the third flange 786 is displaced horizontally from the lateral plane of the second flange 784. The third flange 786 projects in a similar manner from the first anchor portion 783, as the second flange 784 projects for the first anchor portion 783. The relationship between these three flanges and the first anchor portion 783 is shown in detail in FIG. 4.

The U-shaped damper 75, which has an opening 751 for holding the intermediate portion 782 therein, includes a first sheet 752 and a second sheet 753. When the forward stop switch is assembled, as shown in FIG. 3, the first sheet 752 is positioned between a forward end 245 of the guide rail 24 and the intermediate portion 782 of the forward anchor bracket 78. Further, the second sheet 753 is positioned between the intermediate portion 782 of the forward anchor bracket 78 and the forward stop switch 70. The first sheet 752 and the second sheet 753 include apertures 754 therein. The apertures 754 of the damper 75 coincide with the opening 74 in the intermediate portion 782 of the forward anchor bracket 78. Further, the apertures 754 communicate with the head groove 323 of the guide groove 32. The actuator 701 of the forward stop switch 70 protrudes through the apertures 754 of the damper 75 and the opening 74 of the first anchor bracket 78 and into the head groove 323 of the guide rail 24.

The forward stop switch 70 is connected to a source of electricity (not shown in the drawings) or an electric control circuit (not shown in the drawings) by at least one connecting wire 46. One end of the connecting wire 46 is connected to the forward stop switch 70, and an intermediate portion of the connecting wire 46 is bent back along the first flange 785 of the forward anchor bracket 78 such that it assumes a similar C-shape to the cross section of the first flange 785, as shown in FIG. 3. In addition to the connecting wire 46 being bent around the first flange 785, the connecting wire 46 contacts an upper surface of the second flange 784. The connecting wire 46 then contacts a lower surface of the third flange 786. A second end of the connecting wire 46 is located adjacent the rearward end 244 of the guide rail 24, as shown in FIG. 1. The second end of the connecting wire 46 is connected to a connector 80, which in turn is connected to a source of electricity or an electric control circuit.

Figure 5:
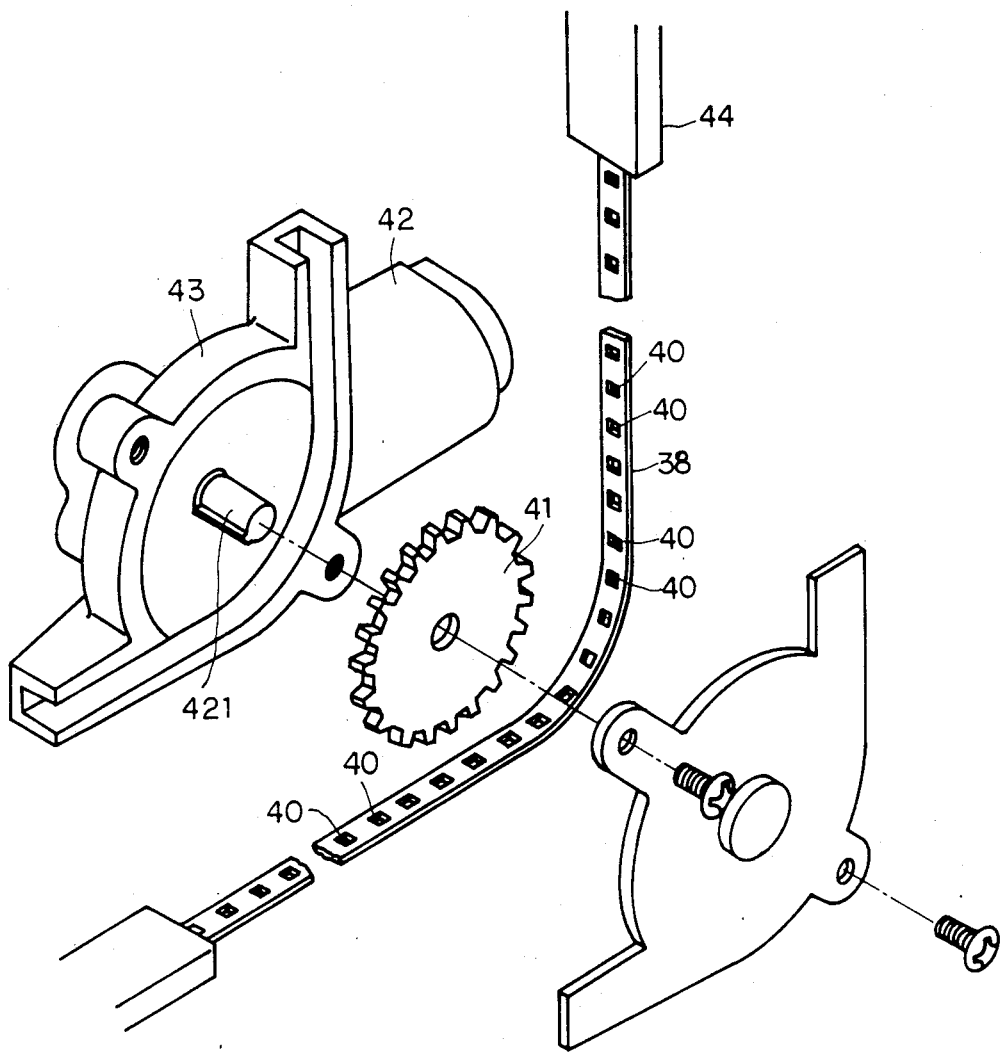
FIG. 5 is an enlarged perspective view showing components of driving means in a disassembled condition for driving a tape which is connected to the slider at an end thereof.

Furthermore, as shown in FIG. 1, the rearward end 244 of the guide rail 24 is connected to a tape track 44, which includes a tape groove therein (not shown in the drawings). This tape groove communicates with the tape groove 36 of the guide rail 24. A lower end of the tape track 44 is in contact with a sprocket housing 43 which is secured to a lower portion of the center pillar 30. As shown in FIG. 5, rectangular openings 40 of the driving tape 38 mesh with a sprocket wheel 41, which is pivotally supported in the sprocket housing 43. The sprocket wheel 41 is adapted to be rotated by an output shaft 421 of a motor 42, and when the sprocket wheel 41 rotates, it drives the driving tape 38 such that it moves along the tape track 44 and the guide rail 24. The movements of the driving tape 38 causes the slider 20 to move between forward and rearward ends of the guide rail 24.

The motor 42 displaces the driving tape 38 whenever an occupant enters the vehicle or prepares to exit the vehicle. For example, when an occupant sits on the seat 10 of the vehicle and closes the door, the sprocket wheel 41 turns in a clockwise direction (with respect to FIG. 5), whereby the slider 20 is displaced from the forward end 245 of the guide rail 24 toward the rearward end 244. The slider 20 stops when it reaches the rearward stop switch 82. Conversely, when an occupant opens the door, the sprocket wheel 41 turns in a counter-clockwise direction, whereby the slider 20 is displaced from the rearward end 244 of the guide rail 24 toward the forward end 245.

Figure 6:
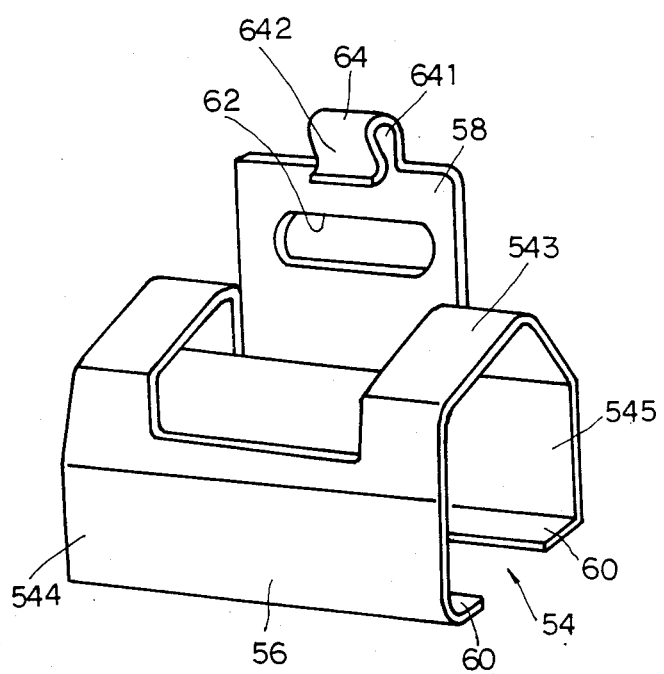
FIG. 6 is an enlarged perspective view showing a fastening means for fastening the guide rail to the vehicle body and holding connecting wires therein.

An embodiment of a hanger which fixes the guide rail 24 to the vehicle body is shown FIG. 6. The hanger 54 includes a holding portion 56, a mounting flange 58 and a clamp 64. The holding portion 56 holds or supports the guide rail 24. The holding portion 56 includes a top horizontal plate 543, an inner vertical plate 544 and an outer vertical plate 545. The inner vertical plate 544 extends downwardly from an inner edge of the top horizontal plate 543, while the outer vertical plate 545 extends downwardly from an outer edge of the top horizontal plate 543. The vertical plate 544 and 545 are spaced laterally apart. Further, two bent portions 60 extend horizontally toward each other from respective lower ends of each vertical plate 544 and 545. As shown in FIG. 2, the bent portions 60 are inserted into apertures 482 of the cover 48. The bent portion 60 are in contact with the bottom surface 249 of the guide rail 24. The covers 48 are positioned between the first side surface 247 of the guide rail 24 and the inner vertical plate 544 of the hanger 54, and between the second side surface 248 of the guide rail 24 and the outer vertical plate 545 of the hanger 54. The mounting flange 58 upwardly extends from the outer vertical plate 545. The mounting flange 58 is provided with a hole 62 for inserting a mounting bolt therethrough.

A clamp 64 is also provided on the mounting flange 58. The clamp 64 includes a clamping tab 642 and a wire receiving recess 641. The wire receiving recess 641 opens downwardly and is defined between the inner vertical plate 544 and the clamping tab 642. The connecting wire 46 is inserted into the wire receiving recess 641 from an downward position by upwardly inserting the wire therein. A portion of the wire receiving recess is narrower in diameter than the connecting wire 46 and thereby maintained within the clamp 64. For a detailed discussion of various hangers for fixing the guide rail 24 to the vehicle body, see contemporaneous U.S. application Ser. No. 712,607, filed Mar. 18, 1985 which has been incorporated by reference.

Additionally, for a detailed discussion of how the automatic seatbelt assembly actually operates, see U.S. Pat. No. 4,343,489, which is herein incorporated by reference.

To install the guide rail assembly 24 on the roof side member 26, a worker simply secures the hangers 54 to the roof side member 26 and forward anchor bracket 78 to the forward pillar 28 and rearward anchor bracket 84 to the center pillar 30 by appropriately securing a plurality of bolts 63. The prior attachment of the connecting wires 46 to the forward anchor bracket 78, specifically, around the flanges 784, 785 and 786 to the guide rail 24, through the wire receiving recesses 641 on the hangers 54, obviates previously unsolved installation problems. More particularly, by wrapping the connecting wire 46 around the first flange 785, the kinking of the connecting wire is prevented.

Figure 7:
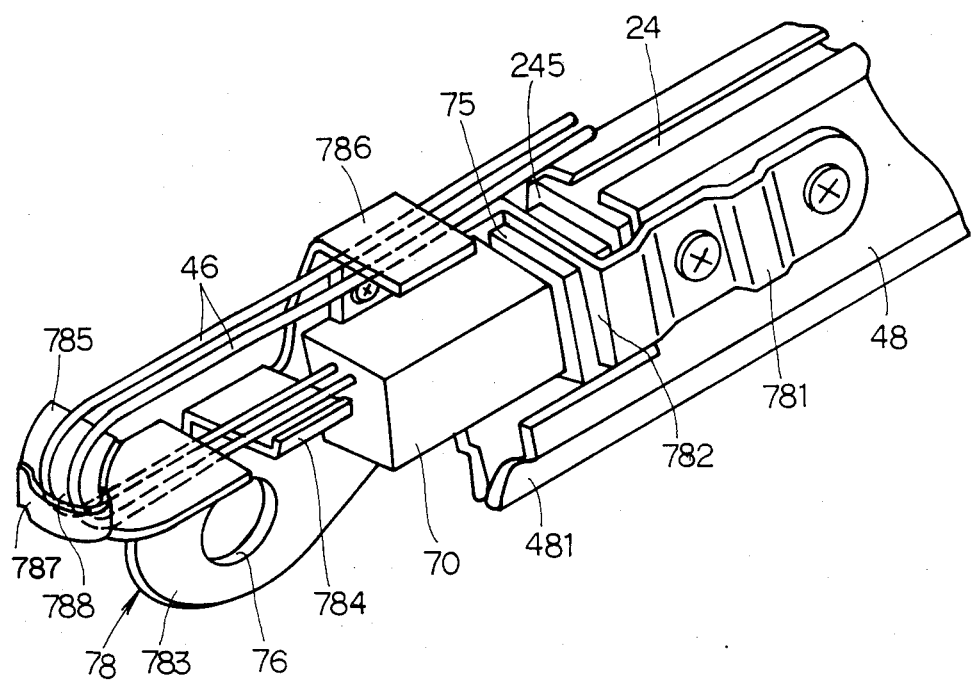
FIG. 7 is an enlarged perspective view of a second embodiment of the invention showing in detail components which comprise a forward end portion of the guide rail shown generally in FIG. 1.

FIG. 7 discloses a second embodiment of a forward stop switch assembly according to the present invention. Most of the components shown in FIG. 7 are similar to the components disclosed in FIG. 3. However, the differences between the first and second embodiments shall be discussed.

A forward anchor bracket 78 includes a first flange 785, a second flange 784 and a third flange 786, all three flanges being located on the first anchor portion 783. This first flange 785 is disposed on a forward end of the first anchor portion 783. The lateral plane of the first flange being substantially perpendicular to the longitudinal plane of the first anchor portion 783. The first plane 785 has a cross section which is substantially C-shaped. This C-shaped cross section permits the electrical connecting wires 46 to be positioned around the first flange 785 and prevents folding or kinking of the wires 46. Additionally, a first clamping tab 787 is provided laterally across the first flange 785. The first clamping tab 787 is provided such that it substantially surrounds the C-shaped first flange 785 at a forward portion thereon. In other words, the clamping tab 787 extends between inner and outer edges of the first flange 785, and is secured to at least the inner or outer edge of the first flange 785. The first clamping tab 787 creates a first recess 788 between itself and the first flange 785. The first recess 788 is designed such that it is narrower than the diameter of the connecting wire 46 so that the connecting wire 46 can be held in place around the C-shaped first bracket 785 and the first clamping tab 787. The clamping tab 787 can be constructed from flexible materials.

The first clamping tab 787 results in the connecting wire 46 being fixed more securely to the C-shaped first flange 785. More specifically, after the connecting wire 46 has been placed around the first flange 785, the clamping tab 787 being fixed to at least the inner or outer edge of the first flange 785 is bent around the connecting wire 46 and around the edge of the first flange 785 which it is not fixed to. Thus, the clamping tab 787 results in the connecting wire 46 being fixed more securely around the C-shaped first flange 785.

As disclosed herein, the present invention provides a means for preventing the kinking of connecting wires, which are attached to forward and rearward stop switch assemblies, by proving a novel apparatus for locating the connecting wires on a C-shaped member. Thus, the present invention is a significant contribution to the art because a seatbelt assembly can be installed by a worker in a shorter amount of time, thereby reducing production time and production costs.

While only a forward stop switch assembly has been described in detail, it should be apparent to an artisan of ordinary skill in the art that a rearward stop switch assembly can be constructed similarly to the forward stop switch assembly, with only minor modifications being necessary. Such a rearward stop switch assembly is represented generally by the numeral 84 in FIG. 1. Further, it should also be apparent that the present invention has been described in its preferred embodiments, but should not be limited thereto, and may be otherwise embodied within the scope of the following claims.

What is claimed is:

1. A seatbelt assembly for automatically fastening a restraining webbing around an occupant in a vehicle, comprising:
    a guide rail having a first and a second end and a longitudinal guide groove running therebetween;
    a slider which is displaceable along said longitudinal groove, said restraining webbing being fastened at one end thereof to said slider;
    a detecting means for detecting arrival of the slider at said end of said guide rail;
    a connecting wire connected to said detecting means; and
    a detecting means assembly located at said first end of the guide rail for holding said connecting wire, said detecting means assembly comprising an anchor bracket for fixing said detecting means assembly to said vehicle, a first flange connected to said anchor bracket, said first flange having a C-shaped cross section, said connecting wire bending around said C-shaped cross section and a second flange which is connected to said anchor bracket at a first end thereof, said second flange having a lateral plane which is substantially perpendicular to a longitudinal plane of said anchor bracket, said connecting wire contacting an upper surface of said second flange.

2. A seatbelt assembly of claim 1, wherein said second flange further comprises an upward projection located at a second end of the second flange, which is opposite to said first end, said upward projection maintaining said connecting wire upon said upper surface of the second flange.

3. A seatbelt assembly of claim 2, wherein said detecting means assembly further comprises a third flange which is connected to said anchor bracket at a first end thereof, said connecting wire contacting a lower surface of said third flange.

4. A seatbelt assembly of claim 3, wherein said anchor bracket comprises at least a first portion, a second portion and an intermediate portion, said first, second and third flanges being connected to said first portion of the anchor bracket.

5. The seatbelt assembly of claim 4, wherein said detecting means is fixed to said first portion of the anchor bracket.

6. The seatbelt assembly of claim 5, wherein said intermediate portion of the anchor bracket is substantially perpendicular to said first and second portions and is located between said first and second portions.

7. A seatbelt assembly of claim 6, wherein said intermediate portion of the anchor bracket includes an aperture therein.

8. A seatbelt assembly of claim 7, wherein a damper is positioned upon the intermediate portion of the anchor bracket, said damper having an aperture therein, said aperture in the damper coinciding with the aperture in the intermediate portion of the anchor bracket such that said detecting means can detect the arrival of the slider at the first end of the guide rail through said coinciding apertures.

9. The seatbelt assembly of claim 8, wherein said second portion of the anchor bracket is fixed to said guide rail at said first end thereof.

10. The seatbelt assembly of claim 9, wherein a clamping tab is provided upon said C-shaped first flange, such that said clamping tab creates a recess between itself and said C-shaped first flange for holding said connecting wire therein.

11. The seatbelt assembly of claim 10, wherein said clamping tab is fixed to one side of said C-shaped first flange.

12. A seatbelt assembly for automatically fastening a restraining webbing around an occupant in a vehicle, comprising:
    a guide rail having a first and a second end and a longitudinal guide groove running therebetween;
    a slider which is displaceable along said longitudinal guide groove, the restraining webbing being fastened at one end thereof to said slider;

a detecting means for detecting arrival of said slider at said first end of said guide rail;

a connecting wire connected to said detecting means; and a detecting means assembly located at said first end of said guide rail, said detecting means assembly comprising an anchor bracket including a first portion, an intermediate portion and a second portion; and a C-shaped first bracket, fixed to said first portion of said anchor bracket whereby said connecting wire bends around said C-shaped first bracket.

13. A seatbelt assembly of claim 12, wherein said detecting means assembly further comprises a second flange which is connected to said first portion of said anchor bracket at a first end thereof, said second flange having a lateral plane which is substantially perpendicular to a longitudinal plane of said first portion of said anchor bracket, said connecting wire contacting an upper surface of said second flange.

14. A seatbelt assembly of claim 13, wherein said second flange further comprises an upward projection located to a second end of the second flange, which is opposite to said first end, said upward projection maintaining said connecting wire upon said upper surface of the second flange.

15. A seatbelt assembly of claim 14, wherein said detecting means assembly further comprises a third flange which is fixed to said first portion of said anchor bracket at a first end thereof, said connecting wire contacting a lower surface of said third flange.

16. The seatbelt assembly of claim 15, wherein said intermediate portion of the anchor bracket is substantially perpendicular to said first and second portions and is located between said first and second portions.

17. The seatbelt assembly of claim 16, wherein a clamping tab is provided upon said C-shaped first flange, such that said clamping tab creates a recess between itself and said C-shaped first flange for holding said connecting wire therein.

18. The seatbelt assembly of claim 17, wherein said clamping tab is fixed to one side of said C-shaped first flange.

19. A seatbelt assembly for automatically fastening a restraining webbing around an occupant in a vehicle comprising:

a guide rail having a first and a second end and a longitudinal guide groove running therebetween;

a slider which is displaceable along said longitudinal groove, said restraining webbing being fastened at one end thereof to said slider;

a detecting means for detecting arrival of the slider at said first end of said guide rail;

a connecting wire connected to said detecting means; and a detecting means assembly located at said first end of the guide rail, said detecting means assembly comprising:

an anchor bracket including a first portion, an intermediate portion and a second portion;

a C-shaped first bracket fixed to said first portion of said anchor bracket; and a clamping tab provided upon said C-shaped first flange, such that said clamping tab creates a recess between itself and said C-shaped first flange for holding said connecting wire therein.

20. A seat belt assembly of claim 19, wherein said detecting means assembly further comprises a second flange which is connected to said first portion of said anchor bracket at a first end thereof, said second flange having a lateral plane which is substantially perpendicular to a longitudinal plane of said anchor bracket, said connecting wire contacting an upper surface of said second flange.

21. A seatbelt assembly of claim 20, wherein said second flange further comprises an upward projection located at a second end of the second flange, which is opposite to said first end, said upward projection maintaining said connecting wire upon said upper surface of the second flange.

22. A seatbelt assembly of claim 21, wherein said detecting means assembly further comprises a third flange which is fixed to said first portion of said anchor bracket at a first end thereof, said connecting wire contacting a lower surface of said third flange.

23. The seatbelt assembly of claim 22, wherein said intermediate portion of the anchor bracket is substantially perpendicular to said first and second portions and is located between said first and second portions.

24. The seatbelt assembly of claim 19, wherein said clamping tab is fixed to one side of said C-shaped first flange.

* * * * *